(12) United States Patent
Otsuka et al.

(10) Patent No.: US 11,831,471 B2
(45) Date of Patent: Nov. 28, 2023

(54) DIFFERENTIAL COMMUNICATION CIRCUIT

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Shigeki Otsuka, Nisshin (JP); Hyoungjun Na, Nisshin (JP); Takasuke Ito, Nisshin (JP); Yoshikazu Furuta, Nisshin (JP); Tomohiro Nezuka, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

(*) Notice: Subject to any disclaimer, the term of this patent is extended or adjusted under 35 U.S.C. 154(b) by 3 days.

(21) Appl. No.: 17/841,030

(22) Filed: Jun. 15, 2022

(65) Prior Publication Data

US 2022/0407748 A1    Dec. 22, 2022

(30) Foreign Application Priority Data

Jun. 17, 2021  (JP) .................. 2021-100910

(51) Int. Cl.
*H04L 25/02* (2006.01)
*H04B 3/56* (2006.01)

(52) U.S. Cl.
CPC ........... *H04L 25/0272* (2013.01); *H04B 3/56* (2013.01); *H04L 25/0278* (2013.01)

(58) Field of Classification Search
CPC .... H04L 25/0272; H04L 25/0278; H04B 3/56
See application file for complete search history.

(56) References Cited

U.S. PATENT DOCUMENTS

| | | | |
|---|---|---|---|
| 2008/0112233 A1* | 5/2008 | Woo ..................... | G11C 7/1057 365/189.05 |
| 2010/0109704 A1* | 5/2010 | Carr ..................... | G11C 7/1084 326/62 |
| 2011/0280322 A1* | 11/2011 | Suenaga ............. | H04L 25/0278 375/257 |
| 2012/0293230 A1 | 11/2012 | Mori et al. | |

* cited by examiner

*Primary Examiner* — Sung S Ahn
(74) *Attorney, Agent, or Firm* — POSZ LAW GROUP, PLC

(57) ABSTRACT

A differential communication circuit is connected to a communication line formed of a positive communication line and a negative communication line for differential communication. The differential communication circuit includes: a series circuit that includes a resistor element and a connection switch. The resistor element is connected between the positive and negative communication lines when the connection switch is turned on. The circuit also includes a transmission unit that is configured to output a differential signal to the communication line and a controller that is configured to change impedance of the communication line by turning on the connection switch in a period during which the transmission unit does not output the differential signal.

7 Claims, 9 Drawing Sheets

DIFFERENTIAL COMMUNICATION CIRCUIT

CROSS REFERENCE TO RELATED APPLICATIONS

The present application claims the benefit of priority from Japanese Patent Application No. 2021-100910 filed on Jun. 17, 2021. The entire disclosure of the above application is incorporated herein by reference.

TECHNICAL FIELD

The present disclosure relates to a circuit that performs communication using a differential signal.

BACKGROUND ART

There have been known CAN (registered trademark) and M-LVDS, which is a multipoint low voltage transmission, as a standard with improved common mode noise immunity in order to apply communication using differential signals to vehicles or industrial devices. In such communication, a UTP (Unshielded Twist Pare) cable connects between transmission and reception circuits, and terminating resistors adapted to the characteristic impedance are connected to both ends of the line to prevent signal reflection. For example, if the characteristic impedance of the line is 100Ω, the resistance value of the terminating resistor is also set to 100Ω.

SUMMARY

According to a first aspect of the present disclosure, a differential communication circuit is connected to a communication line formed of a positive communication line and a negative communication line for differential communication. The differential communication circuit includes: a series circuit that includes a resistor element and a connection switch, the resistor element being connected between the positive and negative communication lines when the connection switch is turned on; a transmission unit that is configured to output a differential signal to the communication line; and a controller that is configured to change impedance of the communication line by turning on the connection switch in a period during which the transmission unit does not output the differential signal.

DESCRIPTION OF EMBODIMENTS

Figure 1:
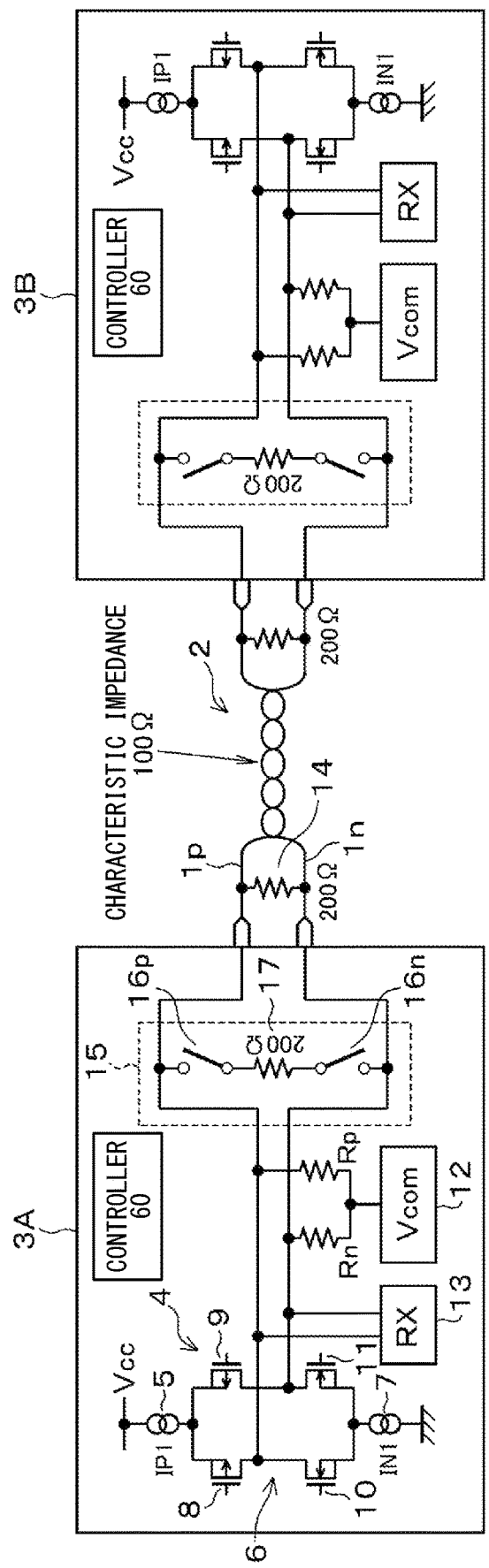
FIG. 1 is a diagram showing a configuration of a communication system according to a first embodiment.

To begin with, a relevant technology will be described first only for understanding the following embodiments.

When the communication line is configured as described above, the combined resistance value is ½ of the characteristic impedance. Therefore, considering unidirectional communication, and to maintain the voltage amplitude of the signal to secure an SN ratio equal to the LVDS method where only the receiver end of the transmission circuit terminates, the power consumption would be doubled.

The present disclosure has been made in view of the above circumstances, and an objective of the present disclosure is to provide a differential communication circuit where power required for transmission is reduced.

As described above, according to the first aspect of the present disclosure, a differential communication circuit is connected to a communication line formed of a positive communication line and a negative communication line for differential communication. The differential communication circuit includes: a series circuit that includes a resistor element and a connection switch, the resistor element being connected between the positive and negative communication lines when the connection switch is turned on; a transmission unit that is configured to output a differential signal to the communication line; and a controller that is configured to change impedance of the communication line by turning on the connection switch in a period during which the transmission unit does not output the differential signal.

With this configuration, when the transmission unit outputs a differential signal to the communication line, even if an impedance mismatch occurs in the communication line, the controller turns on the connection switch after the differential signal is outputted to connect the resistor element between the positive communication line and the negative communication line. Thus, the impedance of the communication line can be changed and generation of reflected waves can be suppressed. Therefore, it is possible for the terminating resistor to have a larger resistance value and thus the power consumption at the time of transmitting the differential signal can be reduced.

According to a second aspect of the present disclosure, in a differential communication circuit, the communication line has a terminating resistor that has a resistance value larger than characteristic impedance of the communication line. The resistor element is configured to have a resistance value such that a combined resistance value of the resistor element and the terminating resistor upon turning on the connection switch is equal to the characteristic impedance of the communication line.

As a result, the power consumption at the time of transmitting the differential signal is reduced by the terminating resistor with a large resistance value, and after the differential signal is outputted, the combined resistance value between the terminating resistor and the resistor element constituting the series circuit is adjusted to the characteristic impedance. Therefore, generation of reflected waves can be avoided.

According to a third aspect of the present disclosure, the differential communication circuit further includes a receiving unit that is configured to receive the differential signal output to the communication line. The controller is configured to turn off the connection switch for a period during which the receiving unit receives the differential signal. The controller is configured to turn on the connection switch when the transmission unit does not output the differential signal in a signal transmission period so that a multi-valued differential signal is transmitted.

Generally, in differential communication, a binary signal of "1,0" or "H, L" is transmitted by changing the polarity for driving the positive and negative communication lines. If the transmission unit does not output a differential signal, the positive and negative communication lines turns into a high impedance state, but if the controller turns on the connection switch at that time, the positive and negative communication lines are in a third driving state. If this third drive state is treated as, for example, "Z", a three-value signal (a ternary signal) of "H, L, Z" can be transmitted.

First Embodiment

As shown in FIG. 1, in a communication system of the present embodiment, transmission/reception circuits 3A and 3B for differential communication are connected to each other via a communication line 2 formed of communication lines 1p and 1n which are a pair of twisted lines. In the transmission/reception circuit 3, a transmission circuit 4 is connected between the power supply Vcc and the ground. The transmission circuit 4 includes a series circuit of a constant current source 5 having one end connected to a power supply, a transmission unit 6 and a constant current source 7 having one end connected to the ground.

The transmission unit 6 includes P-channel MOSFETs 8 and 9 whose sources are connected to the constant current source 5, and N-channel MOSFETs 10 and 11 whose sources are connected to the constant current source 7. Drains of the FETs 8 and 10 are connected to the communication line 1p, and drains of the FETs 9 and 11 are connected to the communication line 1n.

A gate signal is given to the FETs 8 to 11 by a controller 60, and therefore a differential signal is transmitted to the communication line 2. A midpoint potential is applied to the communication lines 1p and 1n by a Vcom circuit (or a common voltage circuit) 12 via resistor elements Rp and Rn. When the controller 60 turns on FETs 8 and 11, the communication line 1p has high potential and the communication line 1n has low potential, whereas when the controller 60 turns on FETs 9 and 10, the communication line 1p has low potential and the communication line 1n has high potential. In this way, the communication line 2 is driven. An RX circuit 13 (corresponding to a receiving unit) is a receiving circuit, but since the present embodiment has no feature regarding signal reception, the details thereof are not illustrated.

It is assumed that characteristic impedance of the communication line 2 is, for example, 100Ω. On the contrary, the resistance value of a terminating resistor 14 connected to the communication lines 1p and 1n outside of the transmission/reception circuit 3 is usually 100Ω, but in this embodiment, the resistance value is set to 200Ω. At a final stage inside the transmission/reception circuit 3, a resistance value changing unit 15 is connected between the communication lines 1p and 1n. The resistance value changing unit 15 is a series circuit of a switch 16p, a resistor element 17 and a switch 16n, and on/off of the switches 16p and 16n is also controlled by the controller 60. The switch 16 corresponds to a connection switch.

Next, operation of the present embodiment is described. When the RX circuit 13 of the transmission/reception circuit 3 receives the differential signal transmitted to the communication line 2, the controller 60 keeps both the switches 16p and 16n off. As a result, power consumption is reduced by the terminating resistor 14 which has a resistance value of 200Ω greater than the characteristic impedance.

Figure 2:
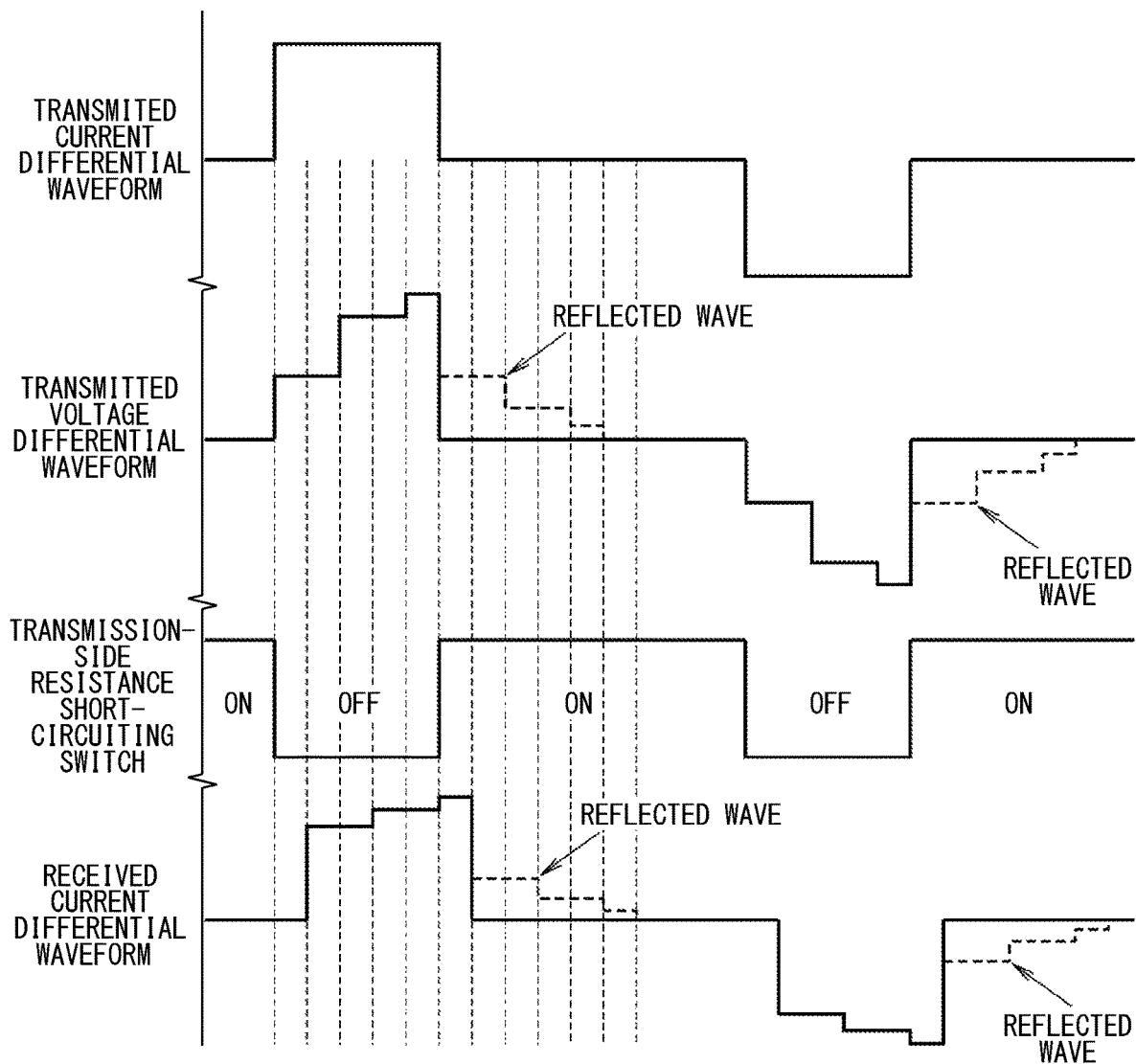
FIG. 2 is a diagram showing waveforms of differential signals transmitted by a transmission circuit.

Then, as shown in FIG. 2, during the period in which the transmission/reception circuit 3 transmits a signal, the controller 60 turns off both the switches 16p and 16n at the same timing as the transmission unit 6 drives the communication lines 1p and 1n. During the remaining period in which the communication lines 1p and 1n have high impedance, both the switches 16p and 16n are turned on. As a result, power consumption by the transmission unit 6 driving the communication lines 1p and 1n is reduced, and after the signal is transmitted, the parallel combined resistance value of the terminating resistor 14 and the resistor element 17 is set to 100Ω to be adjusted to the characteristic impedance of the communication line 2. Thus, generation of reflected waves is suppressed.

As described above, according to the present embodiment, the transmission/reception circuit 3 includes the resistance value changing unit 15 where connection between the communication lines 1p and 1n by the resistor element 17 is made when the switches 16p and 16n are turned on. The controller 60 turns on the switches 16p and 16n in a period during which the transmission unit 6 of the transmission circuit 4 does not output a differential signal to the communication line 2, and thus the impedance of the communication line 2 is changed.

With this configuration, when the transmission unit 6 outputs a differential signal, even if an impedance mismatch occurs in the communication line 2, the controller 60 turns on the switches 16p and 16n to connect the resistor element 17 between the communication lines 1p and 1n after the differential signal is outputted. Therefore, the impedance of the communication line 2 can be changed and generation of reflected waves can be suppressed. Therefore, it is possible to set the terminating resistor 14 to have a larger resistance value to reduce the power consumption at the time of transmitting the differential signal.

Specifically, the resistance value of the resistor element 17 is set so that the combined resistance value of the resistor element 17 and the terminating resistor 14 upon turning on the switches 16p and 16n is equal to the characteristic impedance of the communication line 2. As a result, the power consumption at the time of transmitting the differential signal is reduced by the terminating resistor 14 having a large resistance value, and after the differential signal is outputted, the combined resistance value between the terminating resistor 14 and the resistor element 17 is adjusted to the characteristic impedance to reduce generation of reflected waves.

Second Embodiment

Figure 3:
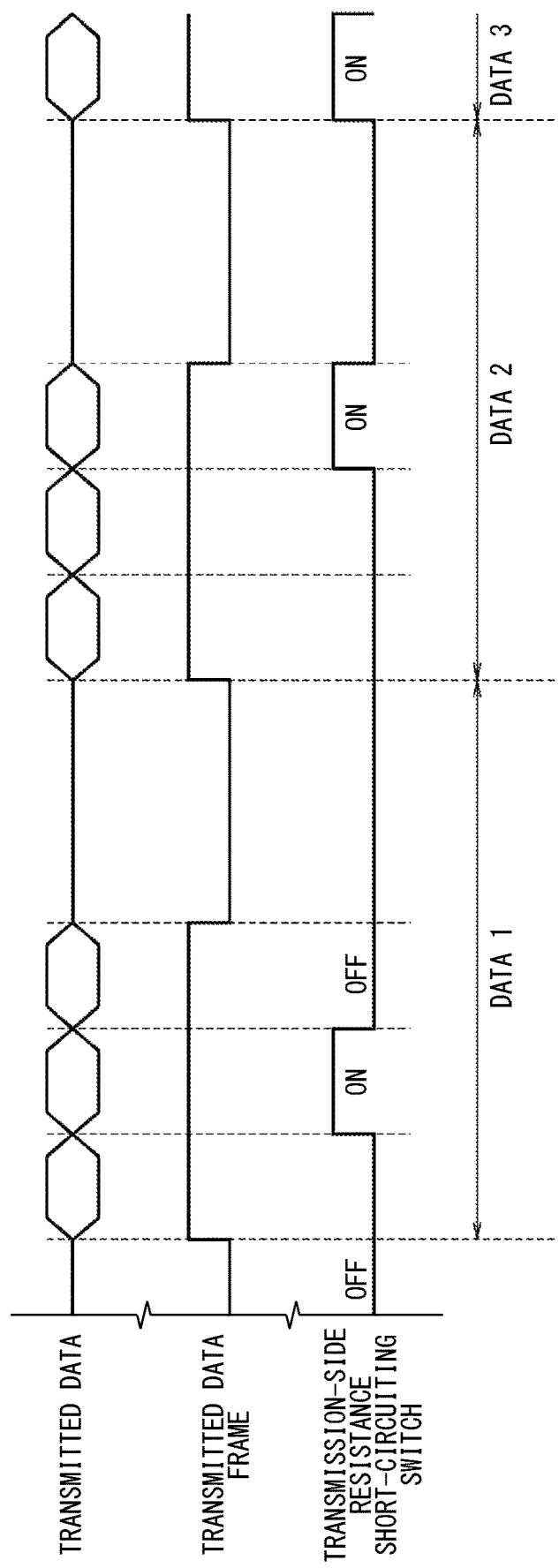
FIG. 3 is a diagram showing waveforms of differential signals transmitted by a transmission circuit according to a second embodiment.

Hereinafter, the same parts as those in the first embodiment are assigned the same reference numerals, and explanations thereof are omitted. Differences from the first embodiment will be described. In the first embodiment, the switches 16p and 16n are turned on in the period during which the transmission unit 6 does not drive the communication line 2, and the communication line 2 has high impedance. On the contrary, according to a second embodiment, as shown in FIG. 3, the state in which the communication line 2 is made to have high impedance during the transmission data frame is treated as a third value of the transmission data.

For example, a state where the communication line 1p has a high potential is defined as "H", a state where the communication line 1n has a high potential is defined as "L", and a state where the communication line 2 has a high impedance is defined as "Z". Then, the controller 60 turns on the switches 16p and 16n when the communication line 2 is made to have high impedance in the transmission data frame. As a result, the transmission period and the reception period are separated.

As described above, according to the second embodiment, the controller 60 turns off the switches 16p and 16n in the period during which the RX circuit 13 receives the differential signal, and a multi-valued differential signal is transmitted by turning on the switches 16p and 16n by the controller 60 when the transmission unit 6 does not output a differential signal during a signal transmission period.

This makes it possible to transmit a "H, L, Z" ternary signal.

Third Embodiment

Figure 4:
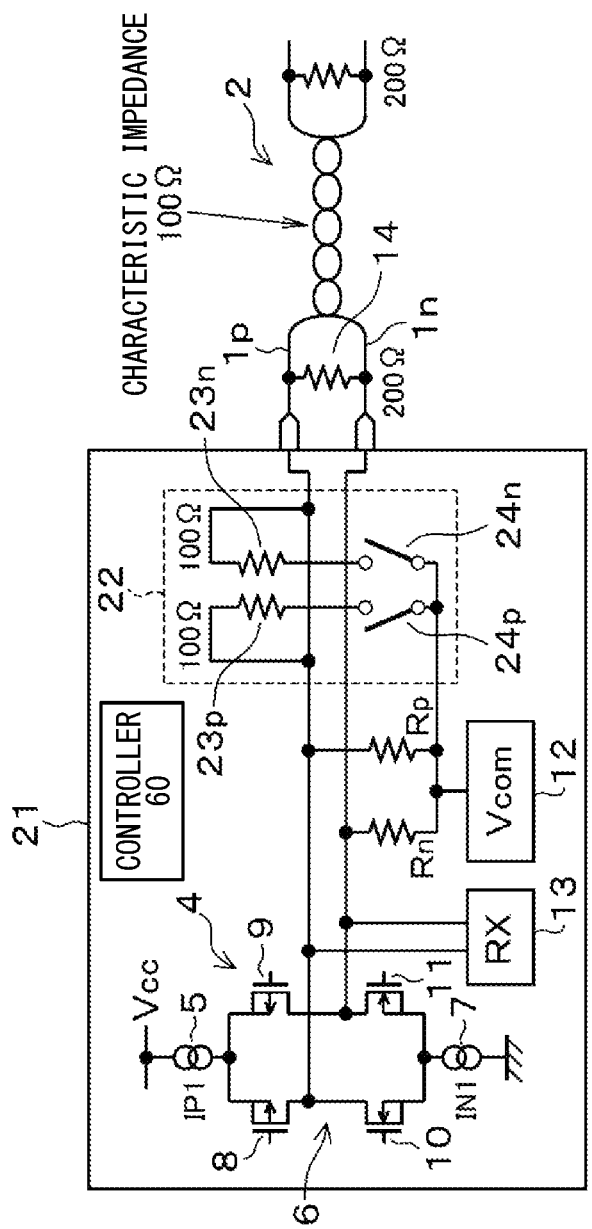
FIG. 4 is a diagram showing a configuration of a communication system according to a third embodiment.

As shown in FIG. 4, the transmission/reception circuit 21 according to the third embodiment includes a resistance value changing unit 22 in place of the resistance value changing unit 15. The resistance value changing unit 22 is a series circuit formed by connecting the resistor element 23p, the switches 24p and 24n, and the resistor element 23n in series. The resistance values of the resistor elements 23p and 24n are both 100Ω. The common connection point of the switches 24p and 24n is connected to a feed point of the Vcom circuit 12.

Even in the above configuration, the controller 60 turns on the switches 24p and 24n to cause the resistor elements 23p and 24n to be connected between the communication lines 1p and 1n so as to be adjusted to the characteristic impedance of the communication line 2. As a result, generation of reflected waves can be suppressed. Further, in this case, the value of the bias resistance from the feed point of the Vcom circuit 12 becomes a lower value.

Fourth Embodiment

Figure 5:
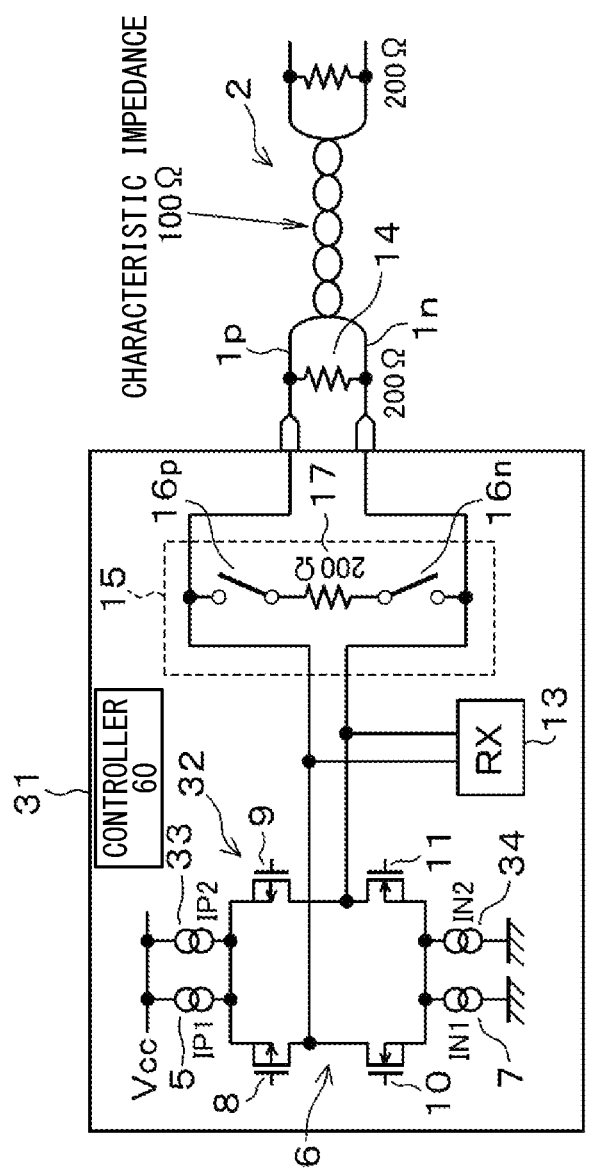
FIG. 5 is a diagram showing a configuration of a communication system according to a fourth embodiment.
Figure 6:
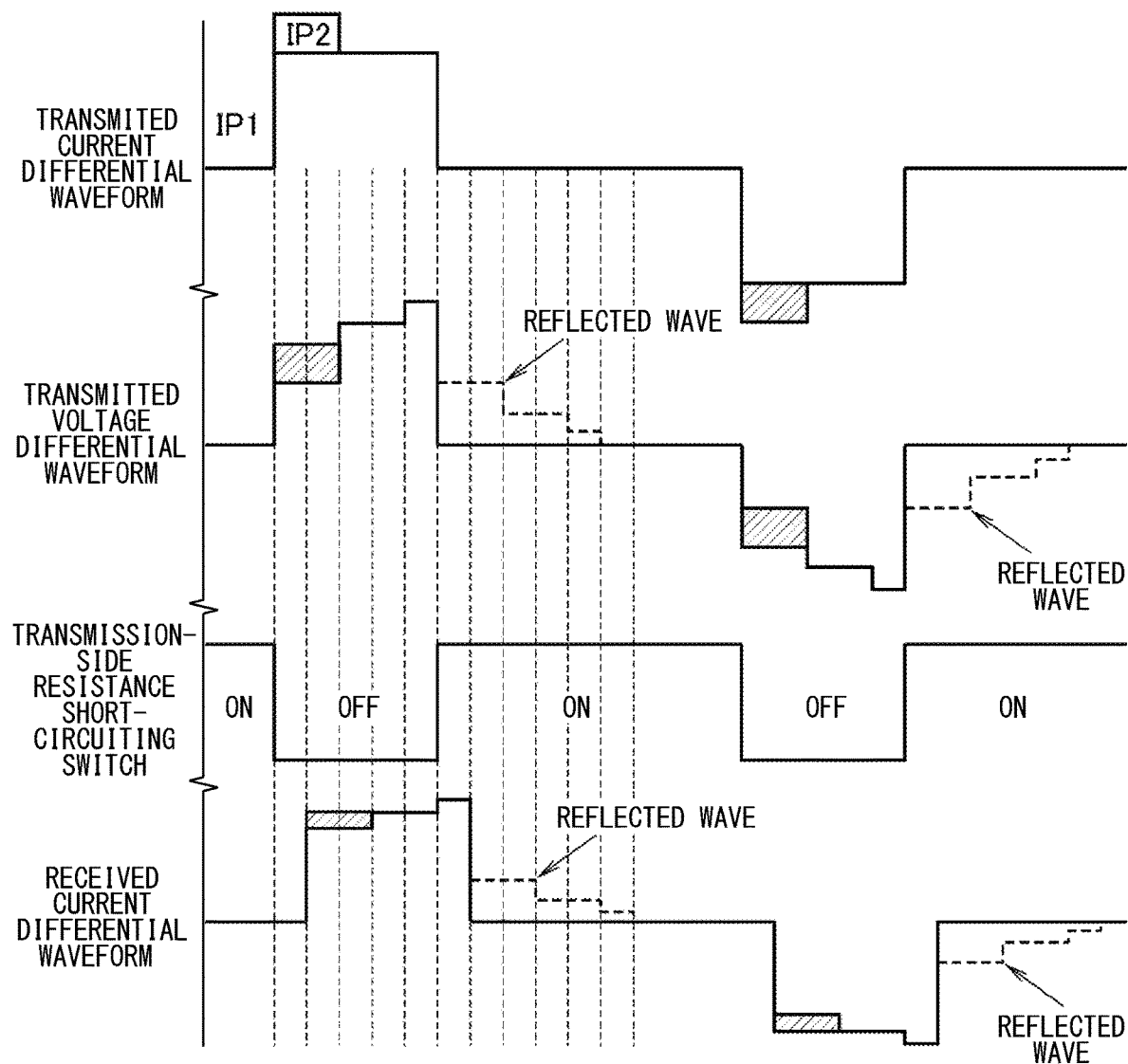
FIG. 6 is a diagram showing waveforms of differential signals transmitted by a transmission circuit.

As shown in FIG. 5, in the transmission/reception circuit 31 according to the fourth embodiment, the transmission circuit 4 in the transmission/reception circuit 3 of the first embodiment is replaced with the transmission circuit 32. In the transmission circuit 32, constant current sources 33 and 34 are connected in parallel to constant current sources 5 and 7, respectively. The constant current sources 33 and 34 are controlled by the controller 60 and are usually stopped. Then, as shown in FIG. 6, the constant current sources 33 and 34 are operated only for an initial period for the transmission unit 6 to transmit a differential signal, and as a result, the current value supplied to the transmission unit 6 is temporarily added. In other words, The constant current source is operated to more increase an amplitude of the differential signal in a signal rise time generated when the transmission unit starts outputting the differential signal than during other periods.

For example, the current values of currents from the constant current sources 5 and 7 are IP1 and IN1, and the current values of currents from the constant current sources 33 and 34 are IP2 and IN2. Of course, (IP1=IN1, IP2=IN2) and (IP1>IP2). Then, as shown in FIG. 6, by increasing, to (IP1+IP2), the current that flows at the beginning of the period (i.e., a signal rise time) during which the transmission circuit 32 transmits the differential signal in a similar manner shown in FIG. 4, the transmission waveform of the signal can be corrected and the amplitude of the reflected wave can be further reduced. It should be noted that the constant current sources 33 and 34 are one example of the amplitude correcting unit.

Fifth Embodiment

Figure 7:
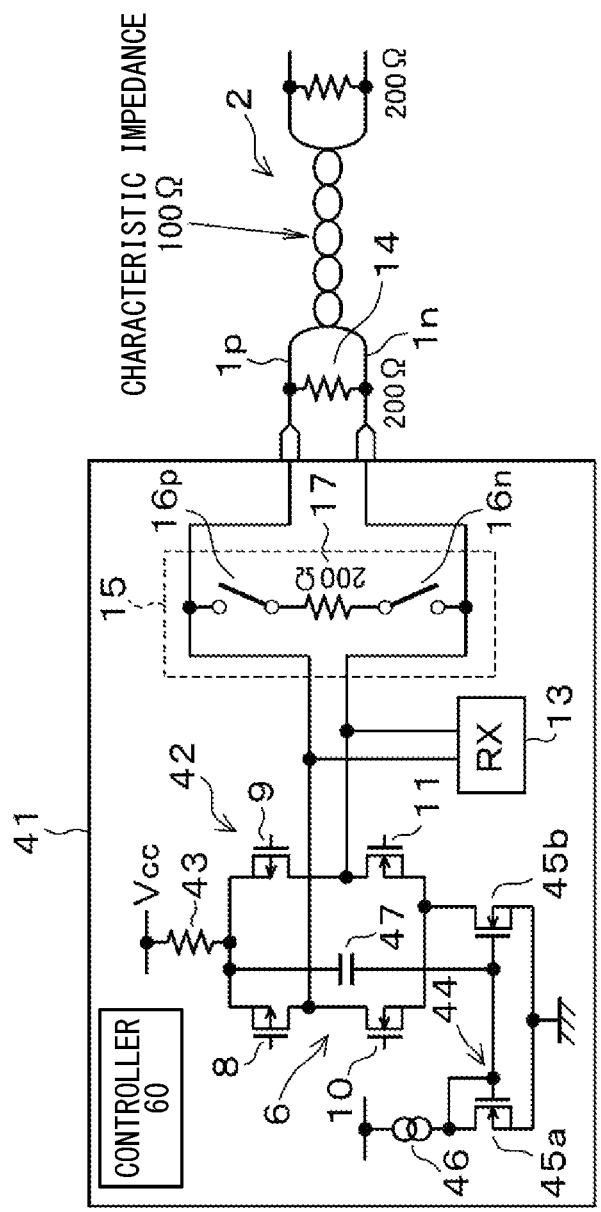
FIG. 7 is a diagram showing a configuration of a communication system according to a fifth embodiment.

The transmission/reception circuit 41 of the fifth embodiment shown in FIG. 7 is a modification to the fourth embodiment. In the transmission circuit (corresponding to a transmission unit) 42, a resistor element 43 in place of the constant current source 5 is connected, and a current mirror circuit 44 in place of the constant current source 7 is connected. The current mirror circuit 44 includes a mirror pair of N-channel MOSFETs 45a and 45b, and the sources of the N-channel MOSFETs are connected to the ground. Further, both gates are connected to the drain of the FET 45a, and a constant current source 46 is connected to the drain of the FET 45a. The drain of the FET 45b is also connected to the sources of the FETs 10 and 11. A capacitor 47 is connected between the sources of the FETs 8 and 9 and the gates of the FETs 45a and 45b.

Figure 8:
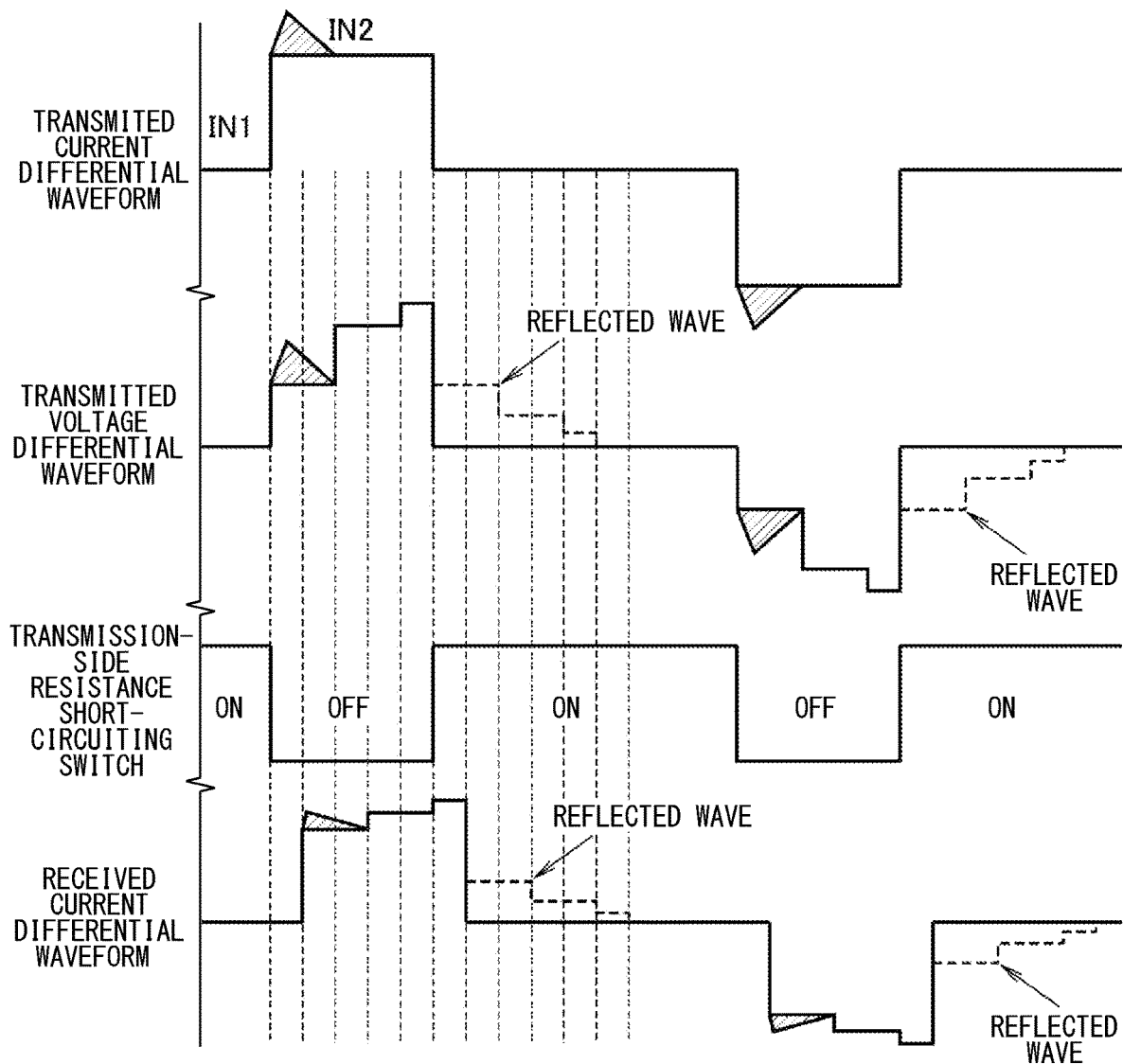
FIG. 8 is a diagram showing waveforms of differential signals transmitted by a transmission circuit.

Next, operation of the fifth embodiment will be described. The capacitor 47 has been charged via the resistor element 43 during the period in which the transmission unit 6 does not transmit the differential signal. Then, when the FETs 8 and 11 or the FETs 9 and 10 are turned on in order for the transmission unit 6 to start transmitting the differential signal, the electric charge in the capacitor 47 is transiently discharged to the gates of the FETs 45a and 45b. As a result, as shown in FIG. 8, since the current that flows at the beginning of the period (i.e., a signal rise time) for transmitting the differential signal temporarily increases to (IN1+IN2), the transmission waveform of the signal is corrected as in the fourth embodiment. Accordingly, the amplitude of the reflected wave can be reduced.

Sixth Embodiment

Figure 9:
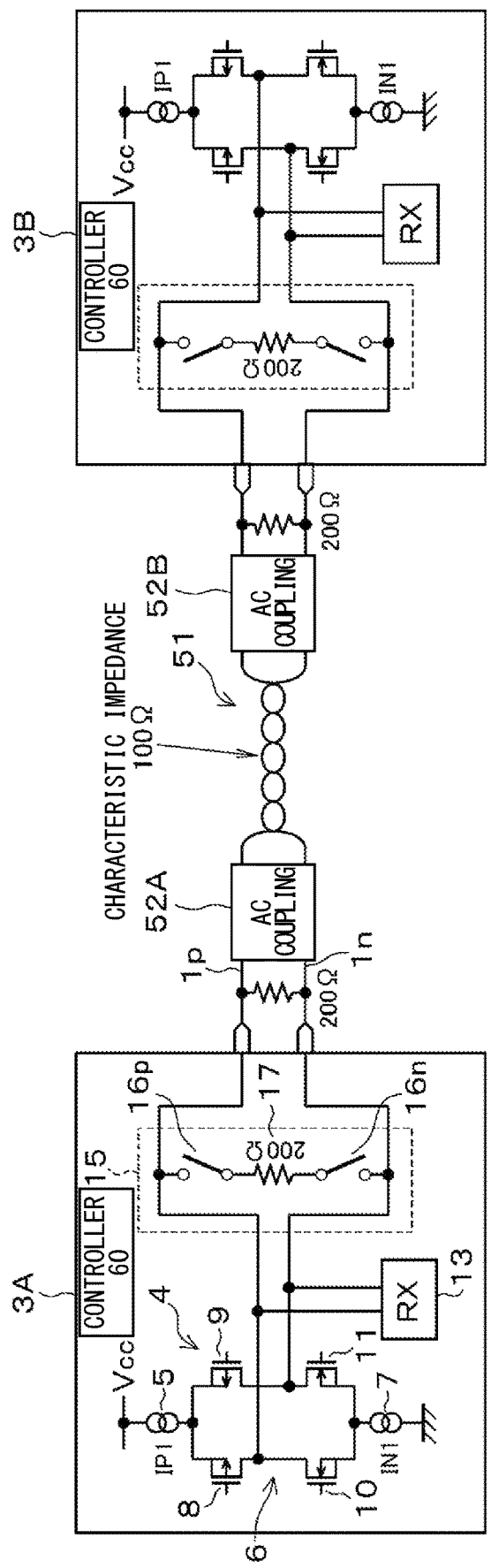
FIG. 9 is a diagram showing a configuration of a communication system according to a sixth embodiment.

In the sixth embodiment shown in FIG. 9, a communication line 51 connecting between the transmission/reception circuits 3A and 3B of the first embodiment performs isolated communication. AC couplings 52A and 52B are connected in parallel to the terminating resistors 14 of the transmission/reception circuits 3A and 3B, respectively. The AC coupling 52 performs capacitive coupling or trans coupling, for example. In this way, the present disclosure can be applied to the communication line 51 that performs isolated communication.

Other Embodiments

The combination of the resistance values of the terminating resistor 14 and the resistor element 17 is not limited to 100Ω/100Ω. The former resistance value may be set to be larger than the characteristic impedance of the communication line 2, and the parallel combined resistance value of the two resistance values may be equal to the characteristic impedance. For example, the combination of the resistance values may be 300Ω/150Ω.

It may be applied to a communication line having a characteristic impedance other than 100Ω.

Although the present disclosure has been described in accordance with the examples, it is understood that the present disclosure is not limited to such examples or structures. The present disclosure encompasses various modifications and variations within the scope of equivalents. Furthermore, various combinations and formations, and other combinations and formations including one or more than one or less than one element may be included in the scope and the spirit of the present disclosure.

The invention claimed is:

1. A differential communication circuit connected to a communication line formed of a positive communication line and a negative communication line for differential communication, the differential communication circuit comprising:
    a series circuit that includes a resistor element and a connection switch, the resistor element being connected between the positive and negative communication lines when the connection switch is turned on;
    a transmission unit that is configured to output a differential signal to the communication line; and
    a controller that is configured to change impedance of the communication line by turning on the connection switch in a period during which the transmission unit does not output the differential signal.

2. The differential communication circuit according to claim 1, wherein
    the communication line has a terminating resistor that has a resistance value larger than characteristic impedance of the communication line, and
    the resistor element is configured to have a resistance value such that a combined resistance value of the resistor element and the terminating resistor upon turning on the connection switch is equal to the characteristic impedance of the communication line.

3. The differential communication circuit according to claim 1, further comprising:
    a receiving unit that is configured to receive the differential signal output to the communication line, wherein
    the controller is configured to turn off the connection switch for a period during which the receiving unit receives the differential signal, and
    the controller is configured to turn on the connection switch when the transmission unit does not output the differential signal in a signal transmission period so that a multi-valued differential signal is transmitted.

4. The differential communication circuit according to claim 1, further comprising:
    a common voltage circuit that is configured to apply a common voltage to each of the positive and negative communication lines, wherein
    the series circuit is formed by connecting, in series, a positive resistor element and a positive connection switch to a negative resistor element and a negative connection switch, and
    a common connection point between the positive connection switch and the negative connection switch is connected to a feed point of the common voltage circuit.

5. The differential communication circuit according to claim 1, further comprising:
    an amplitude correcting unit that is configured to more increase an amplitude of the differential signal in a signal rise time generated when the transmission unit starts outputting the differential signal than during other periods.

6. The differential communication circuit according to claim 5, wherein
    the amplitude correcting unit is configured to temporarily increase a value of current supplied by the transmission unit to the communication line.

7. The differential communication circuit according to claim 6, wherein
    the transmission unit includes:
        a power supply side switch and a ground side switch that are connected to each other in series and have a common connection point connected to the positive communication line;
        a power supply side switch and a ground side switch that are connected to each other in series and have a common connection point connected to the negative communication line;
        a power supply side resistor element that is connected between a power supply and the power supply side switch; and
        a current mirror circuit that is connected between the ground side switch and a ground, and
    the amplitude correcting unit is a capacitor that is connected between a mirror pair constituting the current mirror circuit and a common connection point of the power supply side resistor element and the power supply side switch.

* * * * *